United States Patent [19]

Mathews

[11] 4,183,484

[45] Jan. 15, 1980

[54] MODULAR CONDUIT SPACER RACK

[76] Inventor: Lyle H. Mathews, P.O. Box 3697, Anaheim, Calif. 92803

[21] Appl. No.: 888,353

[22] Filed: Mar. 20, 1978

[51] Int. Cl.$^2$ .............................................. F16L 3/22
[52] U.S. Cl. .................. 248/49; 211/60 R; 248/68 R; 403/287; 403/292
[58] Field of Search .................. 403/287, 292; 174/37; 138/105, 112; 405/154; 61/106, 105; 248/49, 68 R, 68 CB; 46/27, 28, 29; 211/189, 194, 60 R, 183; 52/663, 677, DIG. 2

[56] References Cited

U.S. PATENT DOCUMENTS

| | | | |
|---|---|---|---|
| 2,577,120 | 12/1951 | Franz | 248/68 R |
| 2,995,224 | 8/1961 | Butler et al. | 52/663 |
| 3,062,570 | 11/1962 | Schwartz | 46/29 X |
| 3,089,716 | 5/1963 | Berkowitz | 46/29 X |
| 3,125,196 | 3/1964 | Fenner | 52/663 X |
| 3,856,246 | 12/1974 | Sinko | 248/68 CB |
| 3,964,707 | 6/1976 | Lewis | 248/68 CB X |

FOREIGN PATENT DOCUMENTS

| | | | |
|---|---|---|---|
| 388157 | 6/1965 | Switzerland | 46/29 |
| 1139544 | 1/1969 | United Kingdom | 52/DIG. 2 |

*Primary Examiner*—Rodney H. Bonck
*Attorney, Agent, or Firm*—Philip M. Hinderstein

[57] ABSTRACT

A modular conduit spacer rack comprising a plurality of units which may be interconnected to form a rack for supporting a plurality of conduits in parallel, spaced-apart relationship. Each of the units comprises four generally coplanar arms emanating from a central hub in mutually orthogonal directions, first and second adjacent arms having a predetermined width and thickness, third and fourth adjacent arms forming channels at the free ends thereof, the width and depth of the channels formed in the third and fourth arms being approximately the same as the width and thickness of the first and second arms whereby the third and fourth arms are adapted to receive the first or second arms of adjacent units.

4 Claims, 9 Drawing Figures

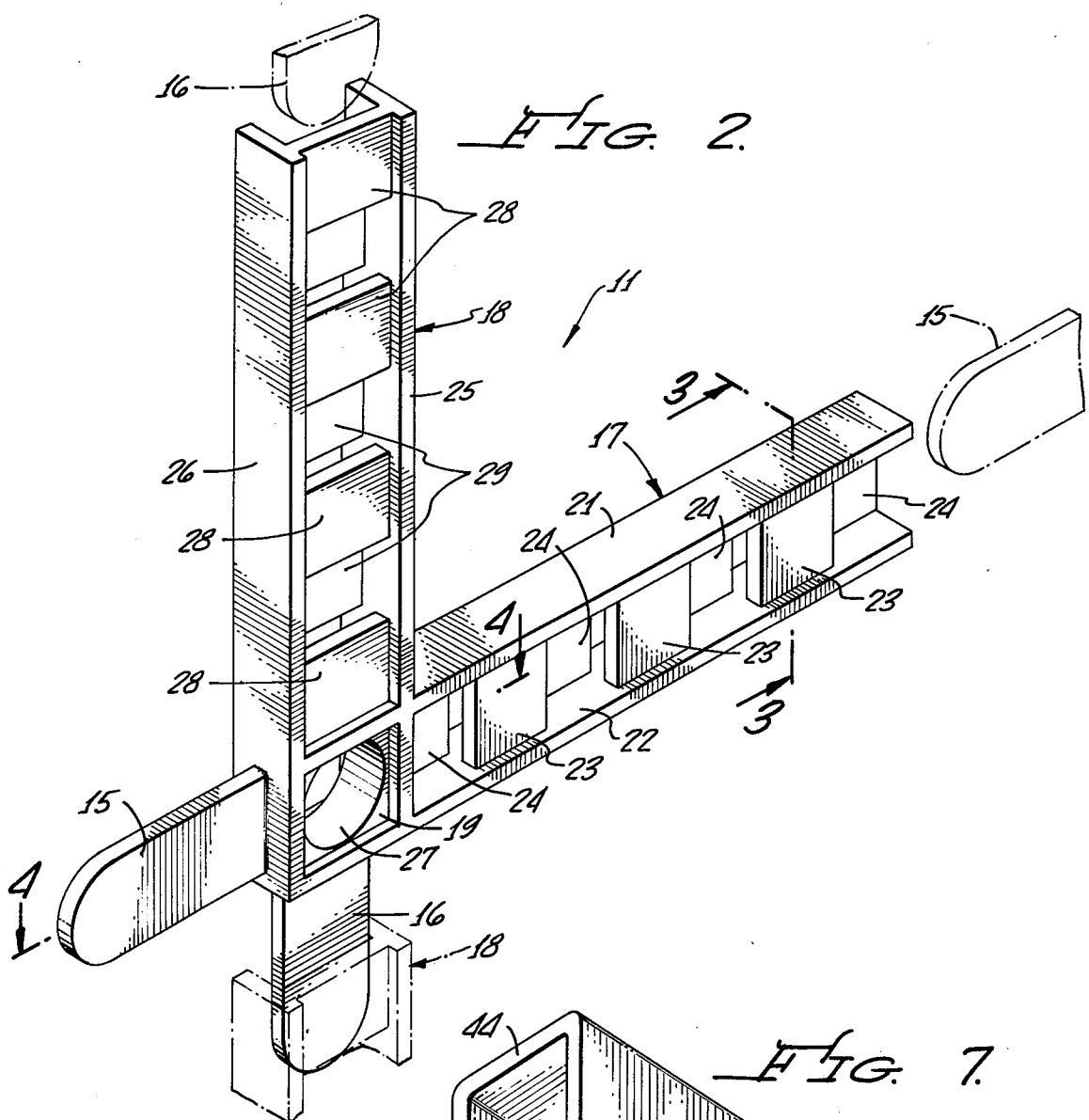
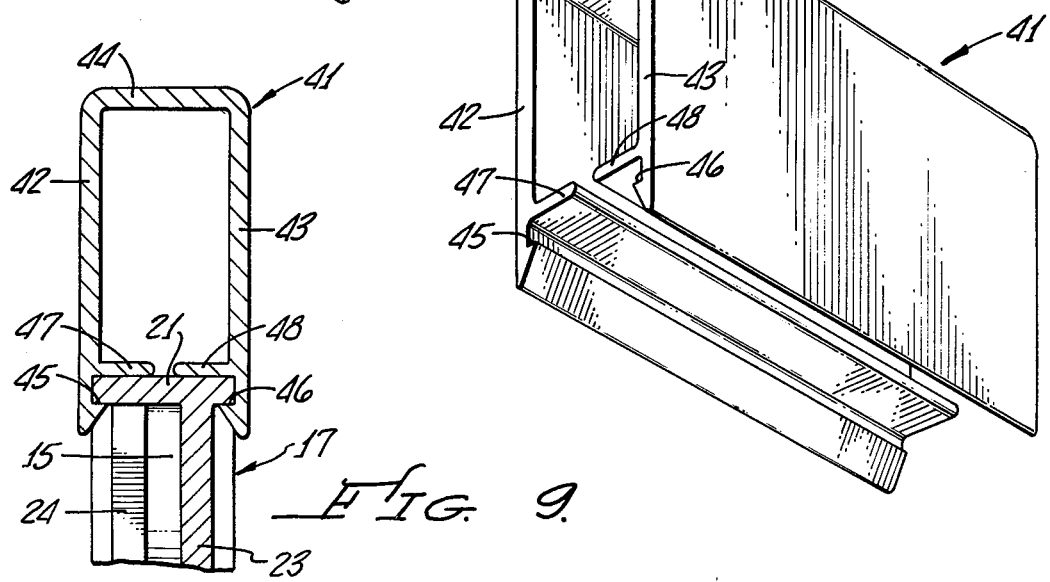

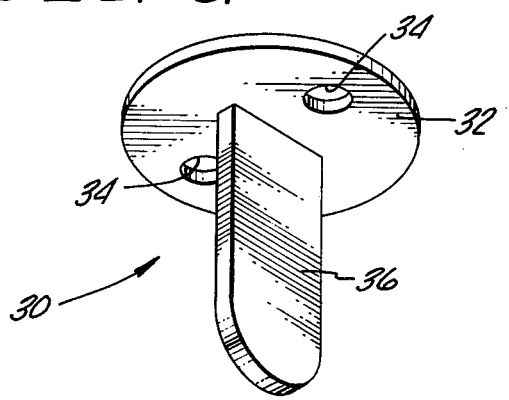
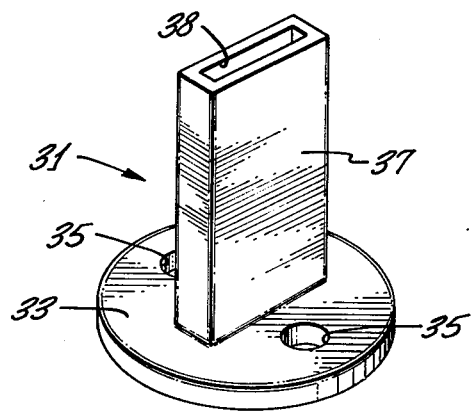
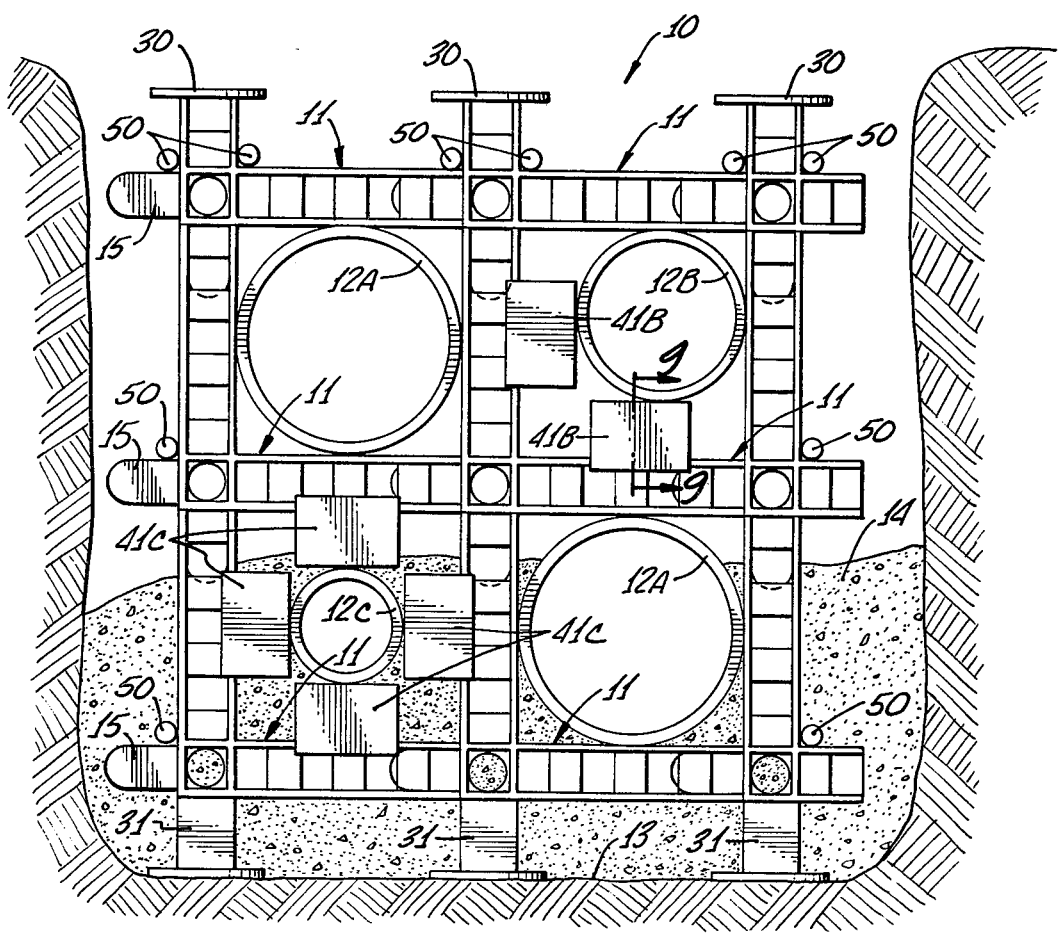

MODULAR CONDUIT SPACER RACK

BACKGROUND OF THE INVENTION

1. Field of the Invention

The present invention relates to a modular conduit spacer rack and, more particularly, to a unit for forming a modular conduit spacer rack for supporting a plurality of conduits and for maintaining separation between such conduits in a ditch.

2. Description of the Prior Art

In a conventional underground installation of electrical cables, the cables are run through conduits placed in a ditch and imbedded in concrete. These conduits generally are less than six inches in diameter. Utility company specifications and municipal code requirements often set forth minimum spacing between adjacent conduits in a ditch and between each conduit and the bottom and sides of the ditch. Typical minimum spacings range from one and one-half inches to three inches. Therefore, one cannot simply place the conduits in a ditch without some means for maintaining the required separation therebetween.

In the past, base plates or spacers have been used to support electrical conduits above the floor of a ditch and/or to maintain separation between adjacent conduits. A problem encountered with base plate-type supports is that as concrete is being poured into the ditch to imbed the conduit, the force of the concrete tends to shift the position of the conduit on the base plate. Thus, to insure that the minimum required separation will be maintained while pouring the concrete, it is often necessary to tie the conduits to the base plate. Such tying operation is time consuming and hence adds considerably to the cost of underground conduit installation.

Another approach of the prior art has been to provide coupling collars at the joints between adjacent conduit sections. These coupling collars are generally square in shape, typically having a cradle at the top for receiving another conduit. Such coupling collars have significant disadvantages. For example, they can be used only at the intersection of adjacent conduit sections, thus significantly limiting their placement within the ditch. Moreover, each conduit must be placed carefully in the ditch atop the cradle of the subsequent conduit.

Furthermore, such prior coupling collars normally are solid. Thus, when concrete is poured into the ditch to imbed the conduit assembly, lateral flow of the concrete is blocked by the collars. Often, this results in voids or spaces adjacent to collars which are free of concrete. Such spaces represent shear points at which the conduit may break or sever should movement of the ground occur. This problem is particularly accute in areas where earthquake tremors are prevalent.

Another problem associated with base plates, spacers, and coupling collars is that they must be formed in several pieces and a different set of parts is required for each size conduit. Thus, a manufacturer is faced with the problem of manufacturing a large number of different parts and the user is faced with the problem of stocking a large number of different parts. Furthermore, it is not possible to interconnect the parts used for supporting one size conduit with those for supporting another size conduit. This substantially complicates the procedure for assembling different sizes of conduits in a ditch.

In my U.S. Pat. No. 3,643,005, there is disclosed a unitary spacer for maintaining separation between electrical conduits in a ditch. Such spacer comprises a short tubular section having an inner diameter slightly larger than the outer diameter of the conduit with which the spacer is employed and an annular disc-shaped portion which extends radially outwardly from the tubular section and is provided at the periphery with a flanged rim. The rim supports the spacer-conduit assembly while the tubular section maintains the spacer perpendicular to the conduit at all times. Such a spacer readily may be slid over a conduit and positioned anywhere along the length thereof. Since the spacer is circular, minimum spacing is insured between adjacent conduits or between the conduits and the wall or floor of the ditch, even though the conduit is not carefully placed in a ditch or shifts in position during pouring of the concrete. Moreover, by providing large openings in the spacer, concrete will flow through the spacer as the conduits are being imbedded, thus insuring an assembly having no concrete voids and hence free of shear points likely to break in an earthquake.

While the spacer of my prior patent is a significant improvement over spacers used heretofore, one problem prevalent with virtually all prior art spacers, including the spacer of my prior patent, is that the spacer is designed for and must be used with only one size conduit. Therefore, different spacers must be provided for conduits of different sizes. Since many different sizes of conduits are used, many different sizes of spacers are required, creating inventory and cost problems. Another problem that is prevalent with virtually all prior art spacers is the fact that they tend to float up from the bottom of the ditch when concrete is poured thereinto. Accordingly, all such spacers require some additional means for holding the racks and conduits in place during pouring of the concrete.

SUMMARY OF THE INVENTION

In accordance with the present invention, there is provided a modular conduit spacer rack which solves all of the problems discussed above. The present spacer rack is made from a plurality of interconnectable units which, when interconnected, form a rack having a plurality of horizontally and vertically oriented, spaced arms for supporting the conduits in parallel, spaced-apart relationship. An adaptor permits the present rack to be used to simultaneously support three different sizes of conduits. The present rack is self-supporting so there is no tendency for the concrete to disassemble same when poured into a ditch. The rack may be positioned in a ditch at any place along the length of the conduit and the rack may be simply held down to prevent floating when the concrete is poured. Furthermore, since the present rack forms rectangular openings for the circular conduits to pass through, concrete will flow through the rack as the conduits are being imbedded, thus inserting an assembly having no concrete voids and hence free of shear points likely to break in an earthquake.

Briefly, the present modular conduit spacer rack comprises of plurality of units which may be interconnected to form a rack for supporting a plurality of conduits in parrallel, spaced-apart relationship, each of the units comprising four generally coplanar arms emanating from a central hub in mutually orthogonal directions, first and second adjacent arms having a predetermined width and thickness, third and fourth adjacent arms forming channels at the free ends thereof, the width and depth of the channels formed in the third and fourth arms being approximately the same as the width and thickness of the first and second arms whereby the third and fourth arms are adpated to receive the first or second arms of adjacent units.

It is therefore an object of the present invention to provide a modular conduit spacer rack.

It is a further object of the present invention to provide a unit for forming a modular conduit spacer rack for supporting a plurality of conduits in parallel, spaced-apart relationship.

It is a still further object of the present invention to provide a unit for forming a modular conduit spacer rack whereby a minimum of parts may be used to support different sizes of electrical conduits in a ditch.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like or corresponding parts in the several figures and wherein:

BRIEF DESCRIPTION OF THE DRAWINGS

FIG. 2 is a perspective view of unit for forming the modular conduit spacer rack of FIG. 1;

FIGS. 5 and 6 are perspective views of a top and a base, respectively, for use in the rack of FIG. 1;

FIG. 7 is a perspective view of an adaptor for use with the unit of FIG. 2;

FIG. 8 is a sectional view of a ditch with the present rack therein showing the use of the spacer of FIG. 7; and FIG. 9 is an enlarged sectional view taken along the line 9—9 in FIG. 8.

DESCRIPTION OF THE PREFERRED EMBODIMENT

Figure 1:
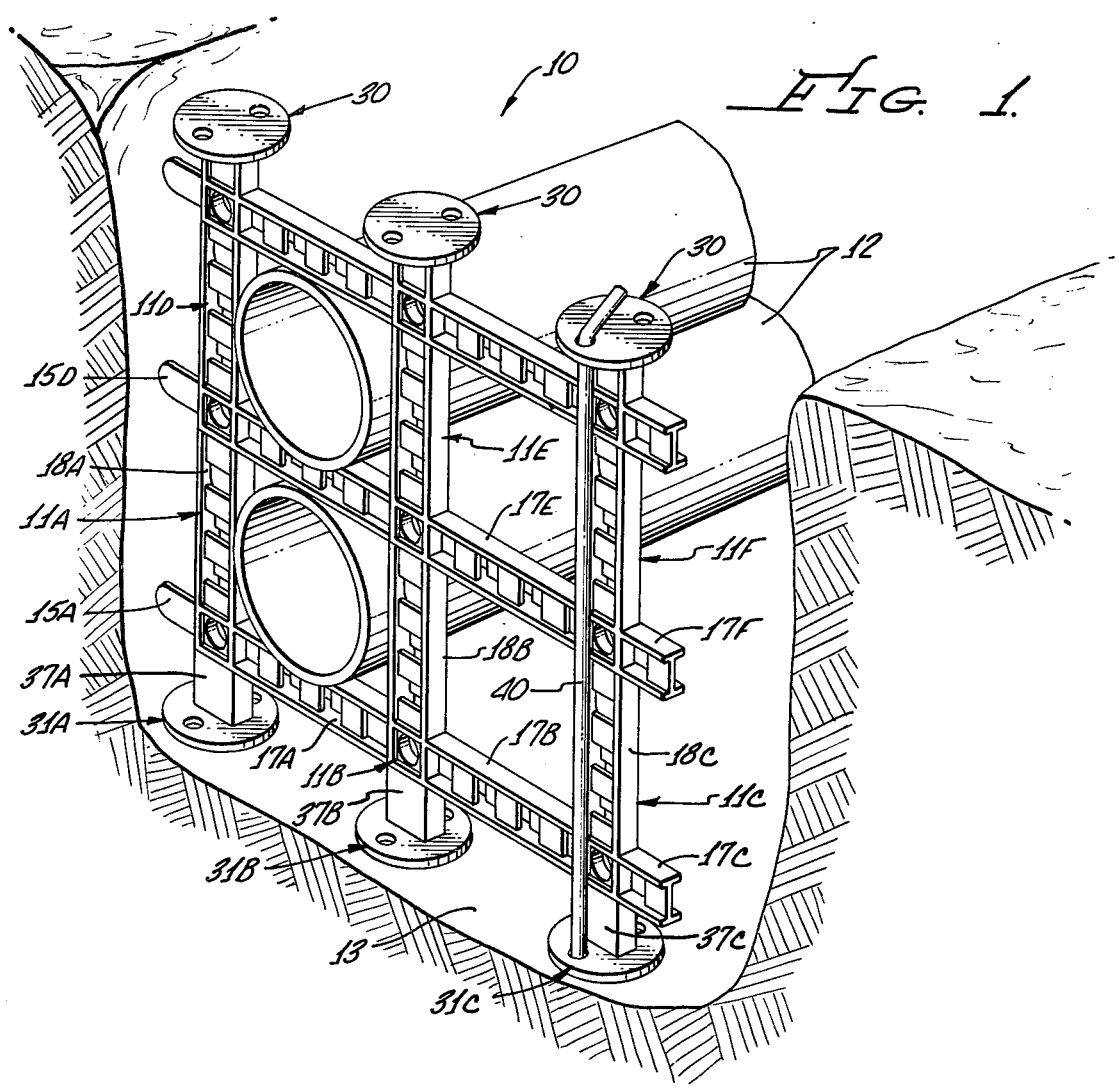
FIG. 1 is a perspective view illustrating the manner in which the present modular conduit spacer rack may be used for maintaining separation between electrical conduits in a ditch.

Referring now to the drawings and, more particularly, to FIGS. 1-4 thereof, there is shown a rack, generally designated 10, formed from a plurality of units 11 for supporting a plurality of conduits 12 in parallel, spaced-apart relationship in a ditch 13. Unit 11 consists of four generally coplanar arms 15-18 which emanate from a central hub 19 in mutually orthogonal directions, arms 15 and 17 being coaxial and arms 16 and 18 being coaxial. Arms 15 and 16, which are adjacent to each other, have identical rectangular cross-sections and have a predetermined width, thickness, and length. Arms 17 and 18 which are identical, generally form channels 20, the width and depth of which are approximately the same as the width and thickness, respectively, of arms 15 and 16.

Figure 3:
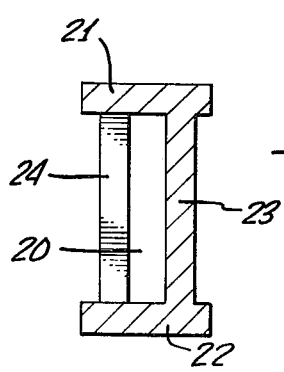
FIGS. 3 and 4 are sectional views taken along the lines 3—3 and 4—4, respectively, in FIG. 2.
Figure 4:
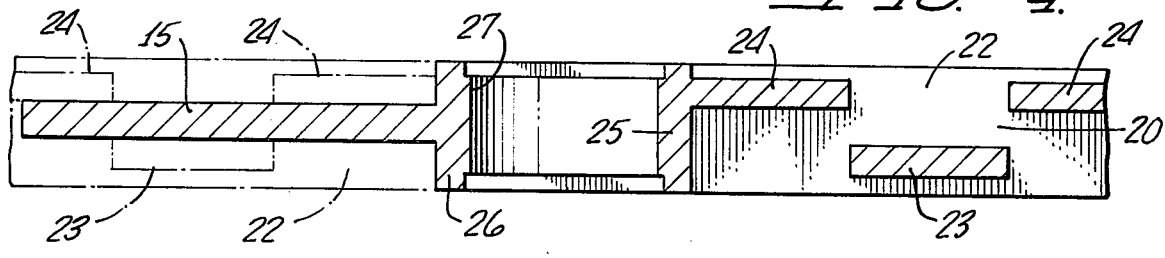

More specifically, arm 17, for example, comprises first and second parallel, spaced sides 21 and 22 which extend perpendicular to arms 15 and 16 and which are spaced by an amount approximately equal to the width of arms 15 and 16. Arm 17 further comprises a first plurality of coplanar segments 23 and a second plurality of coplanar segments 24, segments 23 and 24 defining parallel, spaced sides of arm 17, which sides are parallel to arms 15 and 16 and spaced by an amount approximately equal to the thickness of arms 15 and 16. An end view of arm 17, as is seen in FIG. 3, shows the channel 20 formed by sides 21 and 22 and segments 23 and 24. This channel is adapted to receive the arm 15 of an adjacent unit 10.

The reason for this construction is evident when one considers that a side view of unit 11 shows a construction in which no portion thereof has more than a single thickness. This permits unit 11 to be readily injection molded out of a suitable plastic material in a conventional mold having no movable cross members. As a result, unit 11 is a simple and readily manufacturable part.

Hub 19 is formed by an extension of sides 21 and 22 of arm 17 and the corresponding sizes 25 and 26 of arm 18. A central hole 27 extends through hub 19. Arm 18 includes segments 28 and 29 which correspond to segments 23 and 24 of arm 17.

Before proceeding with an explanation of the manner in which units 11 may be interconnected to form rack 10, reference is had to FIGS. 5 and 6 which show a top 30 and a base 31, respectively, for use with units 11. Top 30 includes a disc 32 whereas base 31 includes a disc 33, discs 32 and 33 having holes 34 and 35, respectively, therein. Extending perpendicularly from disc 32 is a tongue 36 which has the same general appearance as arms 15 and 16. Extending perpendicularly from disc 33 is an elongate member 37 which defines a channel 38 having a length, width, and depth which correspond to those dimensions of arms 15 and 16.

Turning now to FIG. 1, there is shown a first unit 11A including arms 15A, 17A, and 18A. The arm 16 (not shown) of unit 11A extends into the member 37A of a first base 31A. Spaced horizontally from unit 11A is a second unit 11B, only the arms 17B and 18B of which are shown. The arm 15 (not shown) of unit 11B extends into the free end of arm 17A of unit 11A. The arm 16 (not shown) of unit 11B extends into the member 37B of a second base 31B.

Spaced horizontally from unit 11B is a third unit 11C, only the arms 17C and 18C of which are shown. As described previously, the arm 15 (not shown) of unit 11C extends into the free end of arm 17B whereas the arm 16 (not shown) of unit 11C extends into the member 37C of a third base 31C. Arm 15A of unit 11A defines the minimum spacing between one side of rack 10 and one side of ditch 13. Arm 17C of unit 11C would normally provide too much spacing between the other side of rack 10 and the other side of ditch 13. Therefore, a portion of arm 17C can be cut off, as shown, and this is simply done in the field.

Another horizontal row of units 11 may be interconnected as just described to form another tier, including units 11D, 11E, and 11F. It is obvious that the arms 16 (not shown) of units 11D-11F extend into the free ends of arms 18A-18C, respectively, of units 11A-11C, respectively, to provide the construction shown in FIG. 1. It is obvious that any number of units 11 may be used to provide any number of horizontal and vertical rows.

After a rack 10 has been assembled, the unused portions of arms 18 may be cut off, as shown in FIG. 1, and tongues 36 of tops 30 extended into the free ends of arms 18 to complete the assembly as shown. Tops 30 and bases 31 have several advantages. Initially, discs 32 of bases 31 provide a substantial area for supporting rack 10 so that rack 10 does not sink into the bottom of ditch 13. Secondly, with tops 30 in position, holes 34 and 35 in discs 32 and 33, respectively, are aligned. With such an alignment, a rebar 40 can be extended through the aligned holes and driven into the floor of ditch 13. The top of rebar 40 can then be bent over, as shown, to firmly hold rack 10 down to prevent floating of conduits 12 and rack 10 when concrete is poured into ditch 13.

With reference now to FIGS. 7-9, the present invention further includes an adpator, generally designated 41. Adaptor 41 is a generally elongate member having a rectangular, hollow cross-section. That is, adaptor 41 has parallel, spaced sides 42 and 43 which are interconnected at first ends thereof by a side 44. The other ends of sides 42 and 43 terminate in inwardly extending lips 45 and 46, respectively. Reinforcing flanges 47 and 48 extend inwardly from sides 42 and 43, flanges 47 and 48 being coplanar, but not connected. Furthermore, the spacing between flange 47 and lip 45 and flange 48 and lip 46 is equal to the thickness of sides 21 and 22 of arm 17 and sides 25 and 26 of arm 18 of unit 11.

Adaptor 41 may be connected to either arm 17 or arm 18 of unit 11 as shown in FIG. 9. That is, adaptor 41 may be readily extruded from a suitable plastic material, having sufficient flexibility to allow arms 42 and 43 to be spread apart. Once spread apart, arms 42 and 43 engage, for example, side 21 of an arm 17, with flanges 47 and 48 resting on the outside surface of side 21 and lips 45 and 46 engaging the inside surface of side 21.

By way of example, if rack 10 is designed to support conduits having diameters of two, three, or four inches, the length of arms 17 and 18 would be approximately four inches and the length of sides 42 and 43, between side 44 and flanges 47 and 48, would be approximately one inch. Therefore, as shown in FIG. 8, with no adaptor 41, a rack 10 made from a plurality of units 11 may be used to support conduits 12A having a diameter of four inches. If it is desired to support a conduit 12B having a diameter of three inches, two adaptors 41B would be used to reduce the size of the channel formed in rack 10 to three inches. If rack 10 is to be used to support a conduit 12C having a diameter of two inches, four adaptors 41C would be used to reduce the size of the channel formed in rack 10 to this size.

From an inspection of FIG. 8, it is obvious that when concrete 14 is poured into ditch 13, the concrete readily flows through rack 10, between the circular conduits 12 and the rectangular channels in rack 10. Furthermore, the concrete can readily flow through holes 27 in hubs 19 of units 11 and can also readily flow through the openings in arms 17 and 18. As a result, there is no tendency for movement of rack 10 when concrete 14 is poured into ditch 13. Floating is prevented by the use of rebars 40 as explained previously. Furthermore, the multiple arms of units 11 provide ideal locations for the support of horizontal rebars 50 which may be used to surround rack 10 and conduits 12 in certain environments, such as when conduits are imbedded in the ground in building nuclear power plants.

It can therefore be seen that according to the present invention, there is provided a modular conduit spacer rack which solves all of the problems discussed hereinbefore. Spacer rack 10 is made from a plurality of interconnectable units 11, 30, and 31, which, when interconnected, form a rack having a plurality of horizontally and vertically oriented, spaced arms for supporting conduits 12 in parallel, spaced-apart relationship. An adaptor 41 permits rack 10 to be used to simultaneously support three different sizes of conduits 12. Rack 10 is self-supporting so that there is no tendency for concrete 14 to disassemble same when poured into ditch 13. Rack 10 may be positioned in ditch 13 at any place along the length of conduits 12 and rack 10 may be simply held down to prevent floating when concrete 14 is poured, through the use of rebars 40. Furthermore, since rack 10 forms rectangular openings for the circular conduits 12 to pass through and because of the open construction of units 11, concrete 14 will flow through rack 10 and units 11 as conduits 12 are being imbedded, thus insuring an assembly having no concrete voids and hence free of shear points likely to break in an earthquake. Units 11, 30, and 31 are readily molded and unit 41 is readily extruded. As a result, construction costs are at a minimum.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. A unit for forming a modular conduit spacer rack for supporting a plurality of conduits in parallel, spaced-apart relationship comprising:

four generally coplanar arms emanating from a central hub in mutually orthogonal directions, first and second adjacent arms having a predetermined cross-section, third and fourth adjacent arms having channels extending axially thereinto from the free ends thereof, the cross-section of said channels being approximately the same as said cross-section of said first and second arms for receipt of the first or second arms of adjacent units, each of said third and fourth arms comprising:

first and second parallel, spaced sides, said first and second sides extending perpendicular to said first and second arms, the spacing between said first and second sides being approximately equal to the width of said first and second arms; and third and fourth parallel, spaced sides, connected between said first and second sides, said third and fourth sides being parallel to said first and second arms and being spaced by an amount approximately equal to the thickness of said first and second arms, said third and fourth sides of said third and fourth arms being formed from a plurality of non-overlapping, alternating segments whereby extending along said third and fourth arms, each segment terminates at or before the start of the segment of the opposite side.

2. A modular conduit spacer rack for supporting a plurality of conduits in parallel, spaced-apart relationship comprising:

a plurality of one-piece units, each of said units comprising:

four generally coplanar arms emanating from a central hub in mutually orthogonal directions, first and second adjacent arms having a predetermined cross-section, third and fourth adjacent arms having channels extending axially thereinto from the free ends thereof, the cross-section of said channels being approximately the same as said cross-section of said first and sec. nd arms for receipt of the first or second arms of adjacent units, said units being interconnected to form a plurality of horizontally and vertically oriented, spaced sides defined by said third and fourth arms forming square channels for supporting a plurality of conduits in parallel, spaced-apart relationship; and an adpator connectable to said first or second sides of said third or fourth arms for reducing the size of said channels formed in said rack to support conduits having smaller diameters than the lengths of said third and fourth arms.

3. A modular conduit spacer rack according to claim 2, wherein said adaptor is a generally elongate member having a rectangular, hollow, generally U-shaped cross-section, the free ends of said adaptor terminating in inwardly extending lips adapted to engage said first or second sides of said third or fourth arms, said adaptor further including reinforcing flanges extending inwardly from the opposite sides thereof and being spaced from said lips by the thickness of said first and second sides of said third and fourth arms.

4. A modular conduit spacer rack for supporting a plurality of conduits in parallel, spaced-apart relationship comprising:

a plurality of one-piece units, each of said units comprising:

four generally coplanar arms emanating from a central hub in mutually orthogonal directions, first and second adjacent arms having a predetermined cross-section, third and fourth adjacent arms having channels extending axially thereinto from the free ends thereof, the cross-section of said channels being approximately the same as said cross-section of said first and second arms for receipt of the first or second arms of adjacent units, said units being interconnected to form a plurality of horizontally and vertically oriented, spaced sides defined by said third and fourth arms forming square channels for supporting a plurality of conduits in parallel, spaced-apart relationship;

a base unit including a disc and an elongate member extending perpendicularly from said disc, said elongate member defining a channel having a cross-section which is approximately the same as said cross-section of said first and second arms for receipt of the lowermost vertically extending first or second arms of said units in said rack for providing a base for said rack; and a top unit including a disc and a tongue extending perpendicularly from said disc, said tongue having the same general appearance as said first and second arms for extension into the uppermost vertically extending third or fourth arms of said units in said rack for providing a top for said rack, said discs of said base and top units having alignable holes therein.

* * * * *